United States Patent [19]
Oshima et al.

[11] Patent Number: 5,624,732
[45] Date of Patent: Apr. 29, 1997

[54] BRIGHT PRINTED SHEET

[75] Inventors: Masahiro Oshima; Katumi Shimizu, both of Osaka, Japan

[73] Assignee: Meiwa Gravure Co., Ltd., Osaka, Japan

[21] Appl. No.: 345,749

[22] Filed: Nov. 22, 1994

[30] Foreign Application Priority Data

Sep. 28, 1994 [JP] Japan .................. 6-012000 U

[51] Int. Cl.$^6$ .................. B32B 3/28; A47G 35/00
[52] U.S. Cl. .................. 428/167; 428/172; 428/207; 428/542.2; D6/575; D6/617
[58] Field of Search .................. 428/156, 167, 428/172, 143, 187, 207, 195, 212, 913, 542.2; D6/575, 617; 4/557, 609; 160/10

[56] References Cited

U.S. PATENT DOCUMENTS

| 2,951,419 | 9/1960 | Lemelson | 88/82 |
| 4,127,693 | 11/1978 | Lemelson | 428/167 |
| 4,393,108 | 7/1983 | Barker et al. | 428/44 |
| 4,869,946 | 9/1989 | Clay | 428/167 |
| 5,254,390 | 10/1993 | Lu | 428/167 |

*Primary Examiner*—Donald Loney
*Attorney, Agent, or Firm*—William A. Knoeller

[57] ABSTRACT

The transparent plastic sheet is provided with the linearly extending convex lenses formed repeatedly, continuously and integrally therewith, on the surface side thereof, and the transparent printed layer formed on the back side thereof, to give the brightness with variously changing the sheet in color in dependence upon the angles of one's eyes relative to the plastic sheet, whereby improving the designing external appearance.

19 Claims, 3 Drawing Sheets

BRIGHT PRINTED SHEET

FIELD OF THE INVENTION

The present invention relates to a bright printed sheet, in particular to a printed sheet used as household furnishings and the like, such as a table cloth or a bathroom curtain, for which a design is required.

PRIOR ART

The conventional printed sheet used as a table cloth and the like has been formed by printing an optional pattern on an outer surface or a back side of a plastic sheet in order to achieve a design.

However, the conventional printed sheet has been formed by merely printing said pattern on said plastic sheet, that is expressing a printed pattern on a surface of the plastic sheet, the effect is that the design value is not properly utilized.

That is to say, in the case where the printed sheet is used as for example a table cloth, or a bathroom curtain and the like, the printed sheet was quite the same in the printed pattern in every direction and shows no change in color, so that the design value is not optimized.

In order to improve the design external appearance, a device for giving the design a surface which itself forms said pattern with a special design has now been made.

BRIEF DESCRIPTION OF THE INVENTION

It is an object of the present invention to provide a printed sheet capable of variously changing a color of a printed layer provided in said sheet by changing the visual angle relatively to a plastic sheet and additionally giving a brightness to the sheet to give a surface of the sheet a brightness shining as a metallic luster, thereby improving the design external appearance.

In order to achieve the above described object, according to the present invention, not only a transparent plastic sheet is provided with a linearly extending convex lens formed repeatedly, continuously and integrally with a surface thereof on said outer surface thereof but also said transparent plastic sheet is provided with a transparent printed layer formed on a back side thereof.

With the above described construction, said color of said printed layer can be viewed as variously changing depending upon the angle at which the transparent plastic sheet is viewed, due to changes of the respective convex lenses in refractive index resulting from variations of the visual angle relative to the transparent plastic sheet. Furthermore, the printed layer has a transparency, so that the printed sheet can shine in various colors as metallic lusters by light, which is incident upon the back side of the transparent plastic sheet to be totally reflected at appointed critical angles on the respective surfaces of the convex lenses followed by being emitted from the outer surface of the transparent plastic sheet, and light which is incident upon the outer surface of the transparent plastic sheet to be totally reflected at appointed critical angles on the back side of the transparent plastic sheet followed by being emitted from the back side of the transparent plastic sheet.

Consequently, when one's viewpoint is changed in direction relative to the sheet in the case where the above printed sheet is used as for example as a table cloth and the like or when a bathroom curtain is for example shaken and one's viewpoint is changed in angle as a bathroom curtain and a like, a brightness can be given by the respective convex lenses while the printed layer is various changed in color in dependence upon visual angles. Thus the printed sheet can be improved in design external appearance while having both a change of color and brightness.

In addition, it is preferable that the printed layer is provided with at least one colorless transparent portion extending in the same direction as the linearly extending convex lenses within one pitch of the convex lenses. With such a construction, the printed layer is provided with at least one colorless transparent portion extending in the same direction as the linearly extending convex lenses within one pitch of the convex lenses, so that light, which is incident upon the back side of the transparent plastic sheet from said colorless transparent portion, and light, which is incident upon the outer surface of the transparent plastic sheet to be reflected by the colorless transparent portion on the backside, can be totally reflected at appointed angles toward the outer surface of the transparent plastic sheet, so that the transparent plastic sheet can be still more improved in brightness by light transmitting through- and reflected by the colorless transparent portion.

Furthermore, according to the present invention, not only the transparent plastic sheet is provided with the linearly extending convex lens formed repeatedly, continuously and integrally with the outer surface thereof but also the transparent plastic sheet is provided with the transparent printed layer formed on the back side thereof, whereby the printed layer may comprise at least one transparent portion linearly extending in the same direction as the convex lenses and an opaque portion within one pitch of the convex lenses.

According to the present invention, the pattern formed by the printed layer can be made distinct by said opaque portion. In addition, brightness can be given to the transparent plastic sheet depending upon the visual angles for light incident upon the convex lenses through the transparent portion followed by being reflected. Consequently, in the case where the above printed sheet is used as a table cloth and the like, the transparent plastic sheet can be made bright as metallic lusters depending upon the visual angles. Thus a viewer may enjoy the pattern which is made distict by the printed layer of the printed sheet. Thus, a printed sheet which abounds in change can be formed and the design external appearance can be improved.

In addition, it is preferable that the transparent portion comprises merely a colorless transparent portion. With such a construction, the colorless transparent portion can function merely for giving the brightness to make the pattern distinct by the opaque portion adjacent to the colorless transparent portion, so that the brightness can be still more improved by the colorless transparent portion and thus the design external appearance can be still more improved in brightness.

Moreover, the transparent portion may comprise at least one piece of colorless transparent portion and a colored transparent portion. With such a construction, the brightness can be effectively improved by the colorless transparent portion and a desired bright color can be obtained by said colored transparent portion, so that a desired color which abounds in brightness can be obtained by making the pattern clearer by an opaque portion and thus the designing external appearance can be still more improved.

Furthermore, it is preferable that the colored transparent portion is covered with a white ink in the case where the transparent portion comprises at least one colorless transparent portion and the colored transparent portion. In the case where the colored transparent portion s covered with said white ink in the above described manner, when the colored transparent portion is partially covered with the white ink, for example merely a contour of the colored transparent portion is covered with the white ink, said desired bright color can be obtained not only by making the color of the colored transparent portion clear but also making the pattern clear.

Besides, according to the present invention, it is preferable that the transparent plastic sheet is provided with a transparent portion within the scope of one pitch of the linearly extending convex lenses and an opaque patterned portion opaque all over the scope of one pitch of convex lenses, on the back side thereof. With such a construction, brightness can be given by said transparent portion in dependence upon visual angles for the transparent plastic sheet while making the colored pattern clear by the transparent portion to make the transparent patterned portion bright as metallic lusters. In addition, a portion, which does not shine, can be formed on the transparent plastic portion by said opaque patterned portion, so that the pattern can be changed on the whole by a contrast of the opaque patterned portion, which does not shine, with the bright transparent patterned portion, and thus the design external appearance of the transparent plastic sheet can be still more improved.

Furthermore, it is still more preferable that a transparent synthetic resin layer covering the printed layer is formed all over the back side of the transparent plastic sheet. That is to say, the printed layer can be protected by this transparent synthetic resin layer and also the transparent plastic sheet can be improved in dimensional stability.

DETAILED DESCRIPTION OF THE INVENTION

Figure 1:
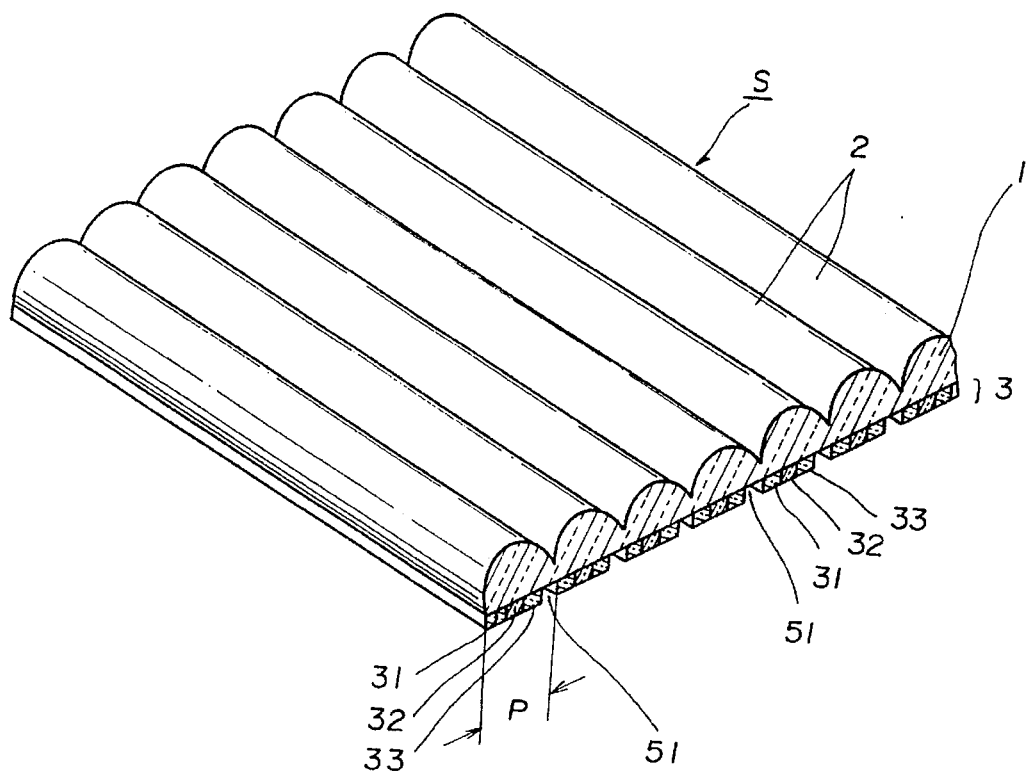
FIG. 1 is a perspective view showing one example of a printed sheet according to a first preferred embodiment of the present invention.

FIG. 1 shows a first preferred embodiment of a printed sheet S according to the present invention. Said printed sheet S comprises a large number of convex lenses 2 semicircular in section and linearly extended on an outer surface of a transparent plastic sheet 1 and formed repeatedly, continuously and integratedly on the outer surface thereof. A printed layer 3 made of a transparent colored ink is provided on the back side of said transparent plastic sheet 1, and at least one piece of colorless transparent portion 51 extended in the same direction as said lenses 2 within a scope of one pitch of lenses 2 and formed on said printed layer 3 formed on the back side of the transparent plastic sheet 1.

Concretely speaking, a large number of linearly extending lenses 2 having a semicircle shaped section are formed integrally with the transparent plastic sheet 1 on the surface side of the transparent plastic sheet 1. Three transparent red-, yellow- and blue-colored layers 31, 32, 33 linearly extended in the same direction as the lenses 2 are continuously provided as the printed layer 3 within said scope of one pitch P of lenses 2 at portions opposite to the respective lenses 2 on the back side of the transparent plastic sheet 1. A non-printed colorless transparent portion 51 is formed on the side portion of the respective colored layers 31 to 33 within the scope of said one pitch P, to form the printed layer 3 on the back side of the transparent plastic sheet 1 by these respective colored layers 31 to 33 and said colorless transparent portions 51.

Colorless transparent and colored transparent plastic sheets can be used as the plastic sheet 1. In addition, suitable acrylic sheets superior in weather resistance, such as soft vinyl chloride sheets abound in flexibility and the like can be optionally selected as the plastic sheet 1.

And, for example thermal embossing means and the like can be adopted as means for forming the lenses 2. In addition, for example an offset printing, a gravure printing and the like may be used as means for forming the printed layer 3.

Furthermore, in the case where transparent plastic sheets superior in elasticity are used as the transparent plastic sheet 1, a printed layer 3, previously printed on a transfer paper or the like and which is inferior in elasticity and the printed layer 3 can be accurately formed by a thermal transfer of the printed layer 3 onto the transparent plastic sheet 1 when the convex lenses 2 are formed on the transparent plastic sheet 1 by the thermal embossing means and the like.

One example of a case where the printed sheet S is produced will be below described.

At first, a transparent soft vinyl chloride sheet of 0.3 mm thick was used as the plastic sheet 1.

In addition, a polyester film of 25 μm thick is used as the transfer paper and linear transparent red-, yellow- and blue-colored layers having the same width are continuously printed on one side surface of said polyester film by means of a unit-type gravure printing machine, followed by forming said non-printed colorless transparent portions 51 on side portions of these three-colored layers 31 to 33, so that a width with these three-colored layers and the colorless transparent portion 51 as a set may amount to 0.6 mm which is a width of the lenses 2 that will be mentioned later.

The transparent plastic sheet 1 and the transfer paper are passed between an embossing roll provided with a large number of molded concave portions having a semicircle-shaped section formed at intervals of 0.6 mm all over the surface thereof and a rubber roll arranged oppositely to said embossing roll so that a printed surface of the transfer paper may be opposite to the transparent plastic sheet 1 previously heated to 150° C. and the transparent plastic sheet 1 may be opposite to the embossing roll, to form a large number of lenses 2 having a semicircle-shaped section at intervals of 0.6 mm integrally with the outer surface of the transparent plastic sheet 1. Simultaneously, the printed surface of the transfer paper is thermally transferred onto the back side of the transparent plastic sheet 1, followed by separating the transfer paper from the transparent plastic sheet 1, to print the transparent three-colored, that is red-, yellow- and blue-colored, layers 31, 32, 33 so as to be linearly extending in the same direction as the respective lenses 2 and the non-printed colorless transparent portion 51 on the side portions of the respective colored layers 31 to 33, whereby forming the printed sheet S shown in FIG. 1.

The above described printed sheet S comprises a large number of linearly extending lenses 2 having the semicircle-shaped section formed continuously and integrally with the surface side of the plastic sheet 1 on the surface side of the plastic sheet 1, and the transparent three-colored, that is red-, yellow- and blue-colored, layers 31, 32, 33 and the non-printed colorless transparent portion 51 formed within the scope of one pitch of the lenses 2 oppositely to the respective lenses 2, respectively, on the back side of the transparent plastic sheet 1. Thus, a single color, that is a red-, yellow- and blue color, of the respective colored layers 31, 32, 33 can be intermittently expressed outside and be variously changed in dependence upon the visual angles relative to the transparent plastic sheet 1 due to the change of the respective lenses 2 in refractive index resulting from the change of visual angles for the transparent plastic sheet 1. Besides, the respective colored layers 31 to 33 have a transparency and also the colorless transparent portion 51 is provided, so that lights incident upon the outer surface of the sheet 1 to be reflected on the back side of the sheet 1, not to mention light transmitting through the respective colored layers 31 to 33 and the colorless transparent portion 51 from the back side of the transparent plastic sheet 1 to be incident, are totally reflected at the critical angles on the respective curved surfaces of the lenses 2 to be emitted from the outer surface of the transparent plastic sheet 1, so that the respective single colors and synthetic colors can be viewed outside from the outer surface of the transparent plastic sheet 1 while being made bright as metallic lusters.

In particular, the printed layer 3 is provided with the colorless transparent portion 51, so that the light incident upon the colorless transparent portion 51 on the back side of the transparent plastic sheet 1 and light incident upon the outer surface of the transparent plastic sheet 1 to be reflected on the colorless transparent portion 51 on the back side can be totally reflected at appointed angles toward the outer surface of the transparent plastic sheet 1. Thus, transparent plastic sheet 1 can be still more improved in brightness by the light transmitting through and reflected on the colorless transparent portion 51.

Consequently, when one's viewpoint is changed in direction relative to the table cloth in the case where the above printed sheet is used as for example a table cloth and the like or a bathroom curtain is for example shaken and thus one's viewpoint is changed in angle in the case where the above printed sheet is used as a bathroom curtain and the like, a brightness can be given to single colors and synthetic colors of the respective colored layers 31 to 33 by the respective lenses 2, while the respective colored layers 31 to 33 are variously changed in color by the respective lenses 2. Thus the printed sheet can be improved in its design external appearance. In addition, the colorless transparent portion 51 may be printed with colorless transparent inks.

Figure 2:
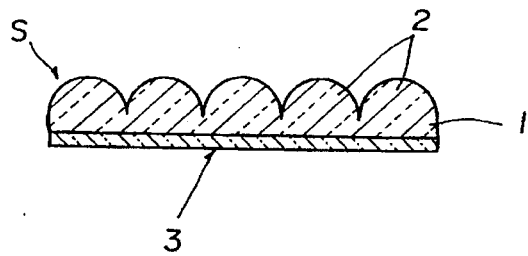
FIG. 2 is a longitudinal sectional view showing a second preferred embodiment.

Although the three-colored layers 31 to 33 were provided at said portions opposite to the respective lenses 2 on the back side of the transparent plastic sheet 1 as the printed layer 3 and the colorless transparent portion 51 was formed on said side portions of the respective colored layers 31 to 33 in the above described first preferred embodiment, the single-colored or the plural-colored printed layer 3 made of colored transparent inks may be formed all over the back side of the transparent plastic sheet 1, as in a second preferred embodiment shown in FIG. 2. Also in this case, the color of the printed layer 3 can be expressed outside from the respective lenses 2 with being variously changed due to the change of the respective lenses 2 in refractive index resulting from the change of angle between the transparent plastic sheet 1 and one's eyes. Moreover, in the case where the printed layer 3 is formed all over the back side of the transparent plastic sheet 1, as above described, the colorless transparent portion 51 is not formed. Instead the printed layer 3 is transparent and thus light can be transmitted through the printed layer 3 to be incident upon the back side of the transparent plastic sheet 1, that is to say, light can be incident upon the outer surface of the sheet 1 to be totally reflected on the back side of the sheet 1. Thus, a brightness can be given to the color of the printed layer 3 by the total reflection of light toward the outer surface of the sheet 1 from the respective lenses 2 to be expressed outside from the transparent plastic sheet 1 while making the printed layer 3 bright as metallic lusters.

A third preferred embodiment will be below described with reference to FIG. 3. A printed sheet S according to said third preferred embodiment comprises linearly extending lenses 2 having a semicircle shaped section formed repeatedly, continuously and integratedly with the outer surface of a transparent plastic sheet 1 and a printed layer 3 having an optional pattern formed on a back side of the transparent plastic sheet 1, and said printed layer 3 comprises at least one piece of transparent portion 5 and opaque portion 6 extended linearly in the same direction as said lenses 2 within a scope of one pitch P of lenses 2.

Figure 3:
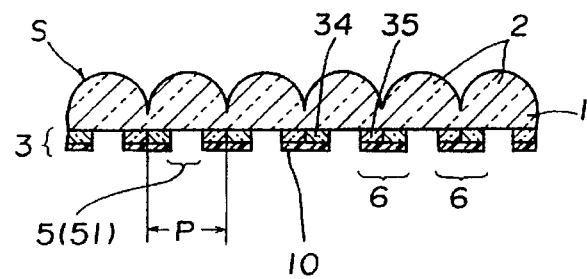
FIG. 3 is a longitudinal sectional view showing a third preferred embodiment.

Concretely speaking, as shown in FIG. 3, two-colored layers different in color, for example yellow- and red-colored layers 34, 35, extended in the same direction as the lenses 2, respectively, are continuously provided in the vicinity of boundary portions of said one pitch P of the respective lenses 2 within the one pitch P of lenses 2 on said back side of the transparent plastic sheet 1 so that boundary lines of the lenses 2 may be continuous portions. Covering layers formed of for example white ink 10 are provided on external surface sides of said colored layers 34, 35. Said opaque portion 6 is formed of the respective colored layers 34, 35 and said covering layers. And one transparent portion 5 formed of a non-printed colorless transparent portion 51 having an appointed width is formed in the same direction as the respective lenses 2 between the respective colored layers 34, 35 in the opaque portion 6.

In order to produce the above described printed sheet S, a transparent soft vinyl chloride sheet of 0.3 mm thick is used as the plastic sheet 1. In addition, a polyester film of 25 μm thick is used as a transfer paper. At first, said white ink 10 of 0.4 mm wide, which becomes the covering layer, is linearly printed and then yellow ink and red ink are successively printed on the white ink 10 on one side surface of said polyester film by means of a unit-type gravure printing machine so that the opaque portion 6 formed of the two-colored, that is yellow- and red-colored, layers 34, 35 covered with the white ink 10 and said non-printed transparent portion 5 may alternately appear on said transfer paper.

The transparent plastic sheet 1 and the transfer paper are then passed between an embossing roll provided with a large number of molded concave portions having a semicircle-shaped section formed at intervals of 0.6 mm all over the surface thereof and a rubber roll arranged oppositely to said embossing roll, with a printed surface of the transfer paper being opposite to the transparent plastic sheet 1 previously heated to 150° C. and the transparent plastic sheet 1 being opposite to the embossing roll, to form a large number of lenses 2 having a semicircle-shaped section at intervals of 0.6 mm integrally with the outer surface of the transparent plastic sheet 1. Simultaneously, the printed surface of the transfer paper is thermally transferred onto the back side of the transparent plastic sheet 1, followed by separating the transfer paper from the transparent plastic sheet 1, to provide the opaque portion 6 having the respective colored layers 34, 35 on the back side of the respective lenses 2 so as to extend over said boundary portions of the respective lenses 2, and the non-printed transparent portion 9 at central portions of the respective lenses 2, whereby forming the printed sheet S shown in FIG. 3.

The above described printed sheet S comprises a large number of linearly extending lenses 2 having a semicircle-shaped section formed continuously and integrally with the outer surface of the plastic sheet 1; the opaque portion 6 formed of two-colored, that is yellow- and red-colored, layers 34, 35 covered with the white ink 10; and the non-printed transparent portion 5 formed between the respective colored layers 34, 35, respectively, at portions opposite to the respective lenses 2 on the back side of the transparent plastic sheet 1. Thus, a single color, preferably a yellow- and red color, of the respective colored layers 34, 35 can be intermittently viewed from outside due to the change of the respective lenses 2 in refractive index resulting from the change of angles between the transparent plastic sheet 1 and one's eyes. In addition, combinations of these respective colors can be intermittently viewed from outside while being variously changed. Moreover, the respective colored layers 34, 35 are opaque, so that the pattern formed by the printed layer 3 can be made distinct to be clearly expressed outside by the opaque portion 6. Furthermore, the transparent portion 5 is provided between the respective colored layers 34, 35, so that a brightness can be given to the surface of the sheet 1 in dependence upon angles of viewing the transparent plastic sheet 1 in the same manner as in the above described case and thus the transparent plastic sheet 1 can be made bright as metallic lusters while making the pattern clear.

Besides, in the preferred embodiment shown in FIG. 3, the transparent portion 5 is formed of merely a non-printed colorless transparent portion 51 to make said colorless transparent portion 51 function merely for giving a brightness and a pattern distinct by the opaque portion 6 adjacent to the colorless transparent portion 51.

With the above described construction, the effects of making the pattern formed by the printed layer 3 distinct by the opaque portion 6 and the pattern bright as metallic lusters by the colorless transparent portion 51 can be still more improved.

Figure 4:
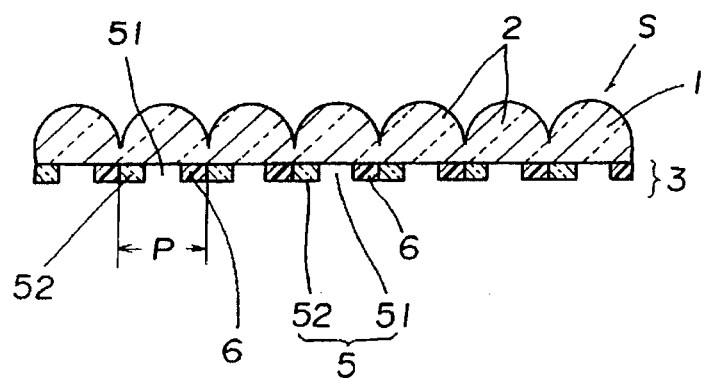
FIG. 4 is a longitudinal sectional view showing a fourth preferred embodiment.

In addition, in the printed sheet S having the opaque portion 6, the transparent portion 5, which is provided together with the opaque portion 6 on the back side of the transparent plastic sheet 1, may comprise at least one piece of colorless transparent portion 51 and colored transparent portion 52, as in a fourth preferred embodiment shown in FIG. 4.

Concretely speaking, said colored transparent portion 52 formed of transparent inks and said opaque portion 6, formed of opaque inks extended linearly in the same direction as the respective lenses 2, are formed at an appointed interval within one pitch P of lenses 2 on the back side of the transparent plastic sheet 1, and one non-printed colorless transparent portion 51 having an appointed width is formed between the colored transparent portion 52 and the opaque portion 6.

In the above described printed sheet S, the transparent portion 5 comprises one piece of colorless transparent portion 51 and two pieces of colored transparent portion 52 within a scope of said one pitch P of lenses 2, so that the brightness of the transparent plastic sheet 1 can be improved by these colorless and colored transparent portions 51, 52. In particular, the brightness can be effectively improved by the colorless transparent portion 51, and the color of the colored transparent portion 52 can be expressed outside of the transparent plastic sheet 1, while being variously changed by means of the lenses 2. Thus, the design external appearance can be still more improved.

Figure 5:
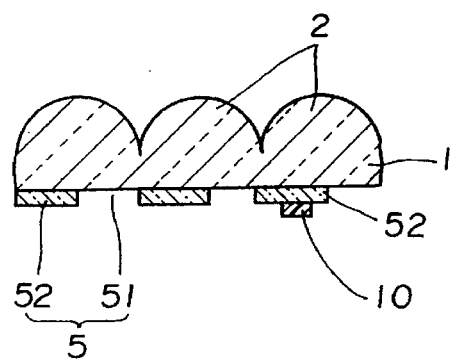
FIG. 5 is a longitudinal sectional view showing a fifth preferred embodiment.

In addition, the white ink 10 may be applied in a dotted shape to a part of the respective colored transparent portions 52 provided as the transparent portion 5 on the back side of the transparent plastic sheet 1, as disclosed in a fifth preferred embodiment shown in FIG. 5. Thereupon, the transparent plastic sheet 1 can be made bright by the color of the colored transparent portions 52, with making the contour of the colored transparent portions 52 partially distinct by the white ink 10.

Figure 6:
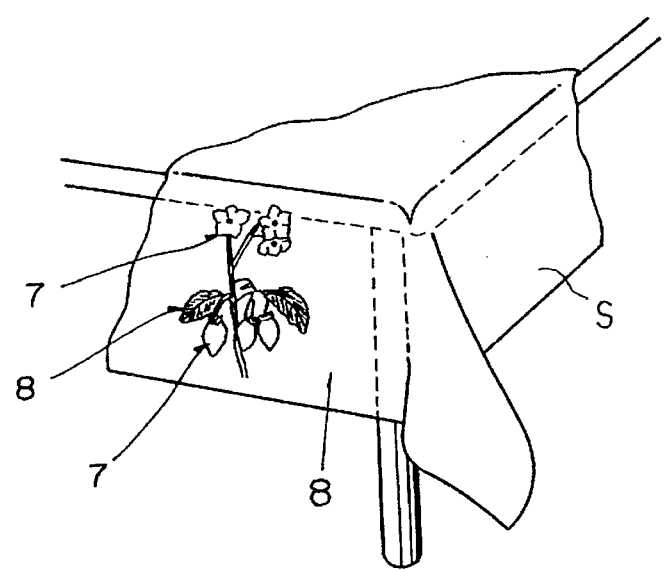
FIG. 6 is a perspective view showing a sixth preferred embodiment.
Figure 7:
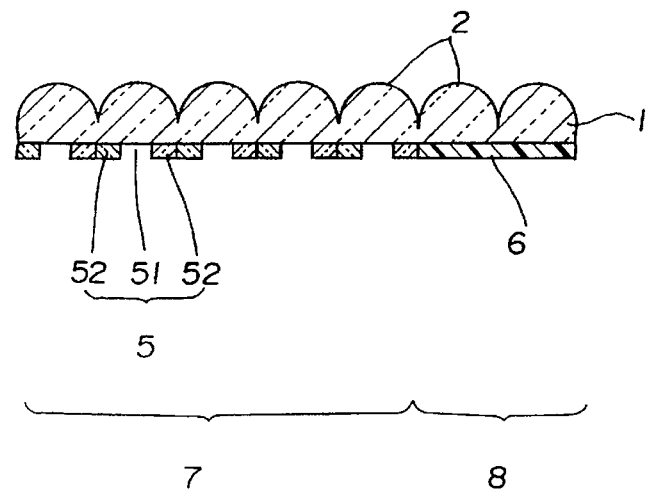
FIG. 7 is a longitudinal sectional view showing said sixth preferred embodiment.

Furthermore, in the printed sheets S according to the above described respective preferred embodiments, the plastic sheet 1 may be provided with a transparent patterned portion 7 having the transparent portion 5 within the scope of one pitch P of linearly extending semicircle shaped lenses 2 and an opaque patterned portion 8 opaque all over the scope of one pitch P of lenses 2, on the back side thereof, as in a sixth preferred embodiment shown in FIGS. 6, 7. FIG. 6 shows a table cloth according to this embodiment draped over a table.

Concretely speaking, in order to produce the printed sheet S as for example a table cloth with a vegetable pattern having flowers, fruits, leaves and the like designed; said transparent patterned portion 7, having the transparent portion 5 consisting of one piece of colorless transparent portion 51 and two pieces of colored transparent portion 52 formed of the transparent colored inks within the scope of one pitch P of lenses 2, is formed as the printed layer 3 at portions corresponding to said flowers and fruits; and said opaque patterned portion 8, composed of the opaque portion 6 formed of the opaque inks so as to be opaque all over a plurality of pitches of lenses 2, is formed at portions corresponding to said leaves and stalks and ground portions without having patterns on the back sides of the respective lenses 2 in the plastic sheet 1, as shown in FIGS. 6, 7.

In the case where the above table cloth is produced, a transparent soft vinyl chloride sheet of 0.3 mm thick is used as the plastic sheet 1. This sheet 1 is provided with the lenses 2 having a semicircle-shaped section formed continuously and integrally therewith at regular intervals of 0.6 mm on the outer surface thereof. The transparent patterned portion 7, forming the portions of flowers and fruits on the back side of the transparent plastic sheet 1, is provided with two differently-colored transparent colored inks formed within the scope of one pitch of lenses 2 so as to be extended in the same direction as the respective lenses 2, respectively. And one non-printed linear colorless transparent portion 51 is formed within the scope of one pitch P between the respective colored transparent portions 52. In addition, the opaque portion 6 formed of the opaque inks is printed all over the surface of said portions corresponding to the leaves and stalks and said ground portions without having patterns, to form the opaque patterned portion 8.

In the above described table cloth, the plastic sheet 1 is provided with a large number of linearly extending semicircle-shaped lenses 2 formed continuously and integrally therewith on the outer surface thereof. The transparent portion 5, consisting of two colored transparent portions 52 and one colorless transparent portion 51 which are linearly extended in the same direction as the respective lenses 2 within the scope of one pitch P of lenses 2, is formed in the transparent patterned portion 7, such as the portions of flowers. The patterned portions, such as the portions of leaves, are printed with the opaque inks all over the surface thereof to form the opaque patterned portion 8. Thus, the contours of the opaque patterned portion 8 and the transparent patterned portion 7 can be made distinct and thus the respective patterned portions 7, 8 can be expressed outside while being made distinct. Moreover, the colors of the respective colored transparent portions 52 can be expressed outside from the transparent plastic sheet 1 while being variously changed by a respective lenses 2. Furthermore, the brightness can be given to the transparent patterned portion 7 by the colorless transparent portion 51 and the respective colored transparent portions 52, to express the transparent patterned portion 7 outside from the transparent plastic sheet 1, with being made bright as the metallic lusters in the same manner as in the above described case and thus the designing external appearance of the table cloth S can be remarkably improved.

Figure 8:
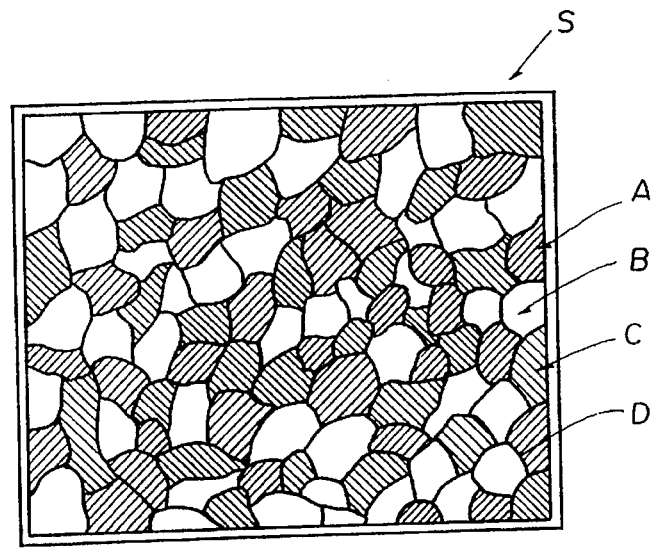
FIG. 8 is a front view showing a seventh preferred embodiment.
Figure 9:
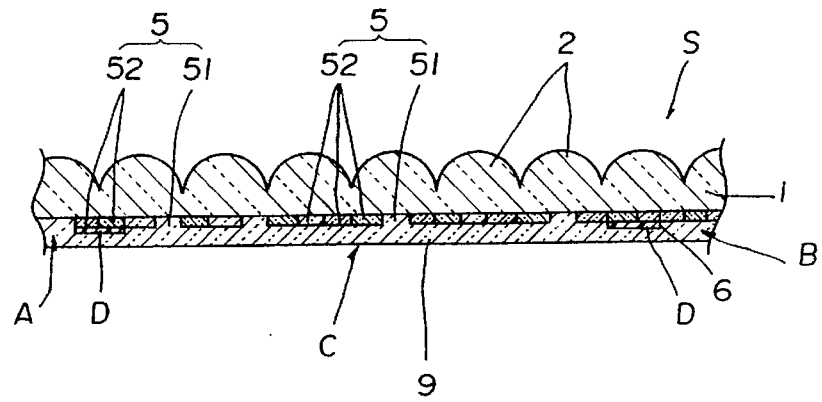
FIG. 9 is a longitudinal sectional view showing said seventh preferred embodiment.

Besides, the printed sheet can be produced also in the form of for example a stained glass-mode printed sheet S comprising a plurality of block patterns, for example first to third block patterns A, B, C, in combination, as in a seventh preferred embodiment shown in FIGS. 8, 9.

That is to say, a thin bluish acrylic sheet is used as the plastic sheet 1 and the lenses 2 having a semicircle-shaped section are formed continuously and integrally with the sheet 1 at regular intervals of 0.6 mm on the surface side of the sheet 1. And, the transparent colored inks colored in a plurality of colors in a blue series are printed at an appointed width within the scope of one pitch P of lenses 2 by the use of the offset printing machine to form a plurality of colored transparent portions 52 linearly extended in the same direction as the respective lenses 2. And one non-printed colorless transparent portion 51 is provided in the same direction as the respective lenses 2 between the respective colored transparent portions 52 within the scope of one pitch P in the same manner as above described, to form said first block pattern A on the back side of the transparent plastic sheet 1. And, said second block pattern B is formed of a plurality of transparent colored inks in for example a red series under the same construction as the first block pattern A. Additionally, said third block pattern C is formed of a plurality of transparent colored inks in for example a green series under the same construction as the first block pattern A.

The respective block patterns A, B, C are provided on the back side of the transparent plastic sheet 1 and boundary portions of the respective block patterns A, B, C are printed with black ink D to form the opaque portion 6, thus forming a border. In addition, a transparent synthetic resin layer 9 formed of a polycarbonate sheet covering the respective block patterns A, B, C is provided on the back side of the transparent plastic sheet 1.

The above described printed sheet S is used under the condition that it is stuck to for example a window and the like. The respective block patterns A, B, C are different in color and bordered with the opaque portion 6 formed of said black ink D, so that viewing pleasure resulting from the brightness is added to the pleasure resulting from the colors to simulate the a feeling of viewing stained glass.

In addition, when said transparent synthetic resin layer 9 covering the respective block patterns A, B, C is provided on the back side of the transparent plastic sheet 1, not only the in particular excellent brightness can be given to the first to third block patterns A, B, C by transmitting light through the respective block patterns A, B, C but also the respective block patterns A, B, C can be protected by the synthetic resin layer 9. Moreover, the transparent plastic sheet 1 can be improved also in dimensional stability. Furthermore, the synthetic resin layer 9 can be formed on the back side of the sheet 1 in the above described respective preferred embodiments in addition to said seventh preferred embodiment.

What is claimed is:

1. A bright printed drapeable sheet in which a transparent drapeable plastic sheet is provided with a plurality of linearly extending convex lenses formed repeatedly, continuously and integrally therewith, on an outer surface thereof, and a transparent printed layer formed on a back side thereof.

2. A bright printed drapeable sheet as set forth in claim 1 in which said printed layer is provided with at least one colorless transparent portion extended in the same direction as said lenses within a scope of one pitch of the linearly extending convex lenses.

3. A bright printed drapeable sheet as set forth in claim 1, wherein the back side forms an exterior surface of the bright printed sheet, so that light originating at a light source facing the back side passes through the transparent printed layer, the back side and the transparent plastic sheet.

4. A bright printed drapeable sheet as set forth in claim 1, further comprising a transparent layer formed on the back side to cover the transparent printed layer and having a surface which forms an exterior surface of the bright printed sheet, so that light originating at a light source facing the back side passes through the transparent layer, the transparent printed layer, the back side and the transparent plastic sheet.

5. A bright printed drapeable sheet as set forth in claim 1, further comprising a transparent layer formed on the back side, said transparent layer having at least two areas of different colors extending in the same direction within a scope of one pitch of the linearly extending lenses, the arrangement of said different colors being in the same order behind each lens which has said areas so that when the printed sheet is viewed, all lenses having said areas will appear to be of the same color.

6. A tablecloth comprising the bright printed drapeable sheet of claim 1.

7. A shower curtain comprising the bright printed drapeable sheet of claim 1.

8. A decorative sheet for a window comprising the bright printed drapeable sheet of claim 1.

9. A bright printed drapeable sheet in which a transparent drapeable plastic sheet is provided with a plurality of linearly extending convex lenses formed repeatedly, continuously and integrally therewith, on an outer surface thereof, and a printed layer formed on a back side thereof, and said printed layer comprising at lease one transparent portion and an opaque portion linearly extended in the same direction as said lenses within one pitch of the lenses.

10. A bright printed drapeable sheet as set forth in claim 9, in which said transparent portion comprises merely a colorless transparent portion.

11. A bright printed drapeable sheet as set forth in claim 9, in which said transparent portion comprises at least one colorless transparent portion and a colored transparent portion.

12. A bright printed drapeable sheet as set froth in claim 11, in which said colored transparent portion is covered with a white ink.

13. A bright printed drapeable sheet as set forth in claim 9, in which the transparent plastic sheet is provided with a transparent patterned portion having the transparent portion within said scope of one pitch of the linearly extending convex lenses, and an opaque patterned portion opaque all over the scope of one pitch of the lenses, on the back side thereof.

14. A bright printed drapeable sheet as set froth in claim 9, in which the transparent plastic sheet is provided with a transparent synthetic resin layer covering the printed layer formed all over the back side thereof.

15. A bright printed drapeable sheet as set forth in claim 9, wherein the back side forms an exterior surface of the bright printed sheet, so that light originating at a light source facing the back side passes through the at least one piece of transparent portion of the printed layer, the back side and the transparent plastic sheet.

16. A bright printed drapeable sheet as set forth in claim 9, further comprising a transparent layer formed on the back side to cover the transparent printed layer and having a surface which forms an exterior surface of the bright printed sheet, so that light originating at a light source facing the back side passes through the at least one transparent portion of the printed layer, the transparent printed layer, the back side and the transparent plastic sheet.

17. A tablecloth comprising the bright printed drapeable sheet of claim 9.

18. A shower curtain comprising the bright printed drapeable sheet of claim 9.

19. A decorative sheet for a window comprising the bright printed drapeable sheet of claim 9.

\* \* \* \* \*